(12) United States Patent
Wang et al.

(10) Patent No.: US 7,620,043 B2
(45) Date of Patent: Nov. 17, 2009

(54) USING CRC-15 AS HASH FUNCTION FOR MAC BRIDGE FILTER DESIGN

(75) Inventors: Yilun Wang, Plano, TX (US); Sheng Wu, Elmsford, NY (US); Roy McNeil, Jr., Warwick, NY (US)

(73) Assignee: Fujitsu Limited, Kawasaki (JP)

( * ) Notice: Subject to any disclaimer, the term of this patent is extended or adjusted under 35 U.S.C. 154(b) by 534 days.

(21) Appl. No.: 11/238,061

(22) Filed: Sep. 29, 2005

(65) Prior Publication Data

US 2007/0071015 A1 Mar. 29, 2007

(51) Int. Cl.
H04L 12/28 (2006.01)
(52) U.S. Cl. .................................................. 370/389
(58) Field of Classification Search ................. 370/389, 370/392, 393, 401
See application file for complete search history.

(56) References Cited

U.S. PATENT DOCUMENTS 6,018,526 A * 1/2000 Liu et al. ..................... 370/401

2004/0098585 A1 * 5/2004 Grove et al. ................. 713/168
2005/0280509 A1 * 12/2005 Tanaka et al. .............. 340/10.3

FOREIGN PATENT DOCUMENTS

WO  WO 2004023732  *  3/2004

* cited by examiner

Primary Examiner—Chirag G Shah
Assistant Examiner—Yong Zhou
(74) Attorney, Agent, or Firm—Hanify & King, P.C.

(57) ABSTRACT

A hash function for a MAC bridge filter that improves bridge performance by reducing overflow of the MAC bridge database and which reduces cost of the device by using relatively few hardware resources. A CRC hash function is used to randomize the search string in the MAC bridge filter so that a consistent bridge performance is achieved regardless of where the bridge is used. Using the CRC as a hash function also results in efficient hardware implementation. In addition, the present invention may be generalized to use a CRC-M as hash function for any bridge filter design.

12 Claims, 5 Drawing Sheets

Fig. 4

| Operation Mode | SVID | CVID | MAC ADDR | BPORT | AGE/Invalid | Bit. AVAIL | PARITY |
|---|---|---|---|---|---|---|---|
| ANYCAST SHARED RING | N/A | 12 bits | 33 bits | 1 bit | 2 bits | 22 bits | 2 bits |
| TARGET SHARED RING | 12 bits | 12 bits | 33 bits | 1 bit | 2 bits | 10 bits | 2 bits |
| ANYCAST PRIVATE RING | N/A | 12 bits | 33 bits | 1 bit | 2 bits | 22 bits | 2 bits |

Fig. 5

| AD Bit Position | [11:0] | [23:12] | [25:24] | [26] | [28] | [34:27] | [35] |
|---|---|---|---|---|---|---|---|
| Anycast Mode | CVID[11:0] | SVID[11:0] | | ACD | BPORT | AVAIL[9:2] | PARITY[1] |
| HB Bit Position | | | [32:0] | | | [34:33] | [35] |
| Unicast Mode | | MAC_ADDRESS | | | | AVAIL[1:0] | PARITY[0] |

USING CRC-15 AS HASH FUNCTION FOR MAC BRIDGE FILTER DESIGN

BACKGROUND OF THE INVENTION

1. Field of the Invention

The present invention relates to a method and system for recovering data from a network element at a network management system (NMS), such as at NMS restart, or at re-establishment of communication after loss of communication with the NMS.

2. Description of the Related Art

Synchronous Optical Network (SONET) is a standard for synchronous data transmission over fiber optic networks. A common configuration of a SONET network includes optical fibers arranged in a ring topology, usually including two physical fibers, a working fiber and a protecting fiber. In order to communicate data over the fiber Ring, electro-optical devices are used to receive and transmit optical signal, receive and transmit electrical signals, and to convert data between optical and electrical signals. Typically, data is communicated electrically to such devices using a network protocol such as Ethernet, which is different than the SONET protocol. Thus, the device must perform data and protocol conversions as well as optical/electrical conversions.

One function block that is included in such a device is known as a MAC bridge. A media access control address (MAC address) is a unique identifier attached to most forms of networking equipment and which is typically used at the data link layer (Layer 2 of the OSI model). A network bridge is a device that connects multiple network segments along the data link layer. Thus, a MAC bridge may be used to connect an electrical network protocol, typically a local area network (LAN) protocol, such as Ethernet, to an optical network protocol used on the fiber Ring, such as SONET, at the data link layer.

Among the functions included in a MAC bridge is a filtering function known as a MAC bridge filter (MBF). Such a MAC bridge filter allows or prevents packets from passing through the MAC bridge based on the MAC address of the packet. This functional block is implemented to avoid unnecessary packet flooding on the Ring (optical) side as well as on LAN (electrical) side. It is designed to filter out the transit packets coming in from the Ring side but destined to other MAC stations on the ringlets. It can also prevent packets between LAN side local stations from entering the Ring.

A MAC address is 48 bits in length, thus, there are in total 2**48 MAC addresses. In reality, a MAC bridge database can store only a limited number of MAC addresses due to hardware resource limitations. For example, in a conventional MAC bridge filter hardware design, the bridge filter may be divided into 32K buckets with each bucket holding 4 MAC addresses with their associated Service Provider VLAN ID (SVID) and customer VLAN ID (CVID). The 12-bit SVID concatenated with the 12-bit CVID and 48-bit MAC address forms the unique entry for the filter, which is essentially a hash table addressed by this 72-bit string. A bucket overflow happens when there are already 4 entries in the bucket and another different 72-bit string is hashed into this bucket. Since the total number of entries contained in the hash table (128K in the above example) is much smaller than the total possible entries ($2^{72}$), MAC bridge bucket overflow is unavoidable. However, excessive bucket overflow results in poor bridge performance. Moreover, a hash function for a MAC bridge filter design should use as few hardware resources as possible. Therefore, a need arises for a hash function for a MAC bridge filter that improves bridge performance by reducing overflow of the MAC bridge database and which reduces cost of the device by using relatively few hardware resources.

SUMMARY OF THE INVENTION

The present invention implements a hash function for a MAC bridge filter that improves bridge performance by reducing overflow of the MAC bridge database and which reduces cost of the device by using relatively few hardware resources. In the present invention, a CRC-15 hash function is used to randomize the 72-bit search string in the MAC bridge filter so that a consistent bridge performance is achieved regardless of where the bridge is used. Using the CRC as a hash function also results in efficient hardware implementation. In addition, the present invention may be generalized to use a CRC-M as hash function for any bridge filter design.

In one embodiment of the present invention, a MAC bridge filter comprises circuitry operable to receive a packet of network traffic, the packet having at least one of a MAC address of a source of the packet and a MAC address of a destination of the packet, a lookup table operable to store a plurality of cyclic redundancy check hashes, each cyclic redundancy check hash generated from data including a MAC address, circuitry operable to lookup the MAC address of the packet in the lookup table, comprising circuitry operable to generate a cyclic redundancy check hash of data including the MAC address of the packet, and circuitry operable to lookup the MAC address of the packet in the lookup table using the generated cyclic redundancy check hash of the data including the MAC address of the packet, and circuitry operable to pass or drop each packet based on whether or not the MAC address of the packet is found in the lookup table.

In one aspect of the present invention, the data including the MAC address may further include an identifier of a service provider and the data including the MAC address of the packet further includes an identifier of a service provider associated with a network port on which the packet was received or a network port from which the packet is to be transmitted, the data including the MAC address may further include an identifier of a customer and the data including the MAC address of the packet further includes an identifier of a customer associated with a network port on which the packet was received or a network port from which the packet is to be transmitted, or the data including the MAC address may further include an identifier of a service provider and an identifier of a customer and the data including the MAC address of the packet further includes an identifier of a service provider associated with a network port on which the packet was received or a network port from which the packet is to be transmitted and an identifier of a customer associated with a network port on which the packet was received or a network port from which the packet is to be transmitted.

In one aspect of the present invention, the cyclic redundancy check hash generated from data including the MAC address, the identifier of the service provider, and the identifier of the customer may comprise less data then the data including the MAC address, the identifier of the service provider, and the identifier of the customer. The identifier of the service provider, and the identifier of the customer may be recoverable from the cyclic redundancy check hash.

In one aspect of the present invention, the cyclic redundancy check hash of the data including the MAC address and the cyclic redundancy check hash of the data including the MAC address of the packet are both generated using a function $G(x)=x^{15}+x+1$. The MAC address may comprise 48 bits, the identifier of the service provider may comprise 12 bits, the identifier of the customer may comprise 12 bits, and the cyclic redundancy check hash may comprise 15 bits. The MAC address comprising 48 bits, the identifier of the service provider comprising 12 bits, the identifier of the customer comprising 12 bits may be recoverable from the cyclic redundancy check hash comprising 15 bits.

BRIEF DESCRIPTION OF THE DRAWINGS

The preferred embodiments of the present invention will be described with reference to the accompanying drawings.

FIG. 4 is an exemplary format of a MAC Lookup Table Entry Data Format List.

FIG. 5 is an exemplary format of a MAC Dynamic Entry Common Format Bit Definition.

DETAILED DESCRIPTION OF THE PREFERRED EMBODIMENTS

The present invention implements a hash function for a MAC bridge filter that improves bridge performance by reducing overflow of the MAC bridge database and which reduces cost of the device by using relatively few hardware resources. In the present invention, a CRC-15 hash function is used to randomize the 72-bit search string in the MAC bridge filter so that a consistent bridge performance is achieved regardless of where the bridge is used. Using the CRC as a hash function also results in efficient hardware implementation. In addition, the present invention may be generalized to use a CRC-M as hash function for any bridge filter design.

The present invention, using the CRC-15 function, is particularly applicable to a MAC bridge filter used in a Resilient Packet Ring (RPR) service unit, and the implementation of the present invention in such a service unit is used as an example of the present invention. However, this is merely an example, as the present invention is applicable to use in other systems and service units. As such, the present invention contemplates use in any bridge filter design.

The MAC Bridge Filter (MBF) functional block is implemented to avoid unnecessary packet flooding on Ring side as well as on LAN side. It is designed to filter out the transit packets coming in from Ring side but destined to other MAC stations on the ringlets. It can also prevent packets between LAN side local stations from entering the Ring. In addition, static filtering database can be provisioned to block frames to/sourced from certain MAC addresses as a measure for troubleshooting and network maintenance.

There are two lookup tables (LUT) in MBF, dynamic LUT (DLUT) and static LUT. The dynamic LUT is stored inside AUX QDR memory while the static LUT is stored inside ERB FPGA block RAMs. Each packet entering the MBF goes through searches in both LUTs. A decision to pass or drop a packet is made based on the combined results from both LUTs. The dynamic LUT is automatically established through MAC source address learning, while the static LUT is downloaded from software through user provisioning.

It is assumed that frames coming into MBF have been through the Ingress Rule Checking Block and subsequent filtering.

Preferably, there are three modes of operation of a RPR service unit: a) ARPORT-PR b) ARPORT-SR c) TRPORT-SR In ARPORT-SR mode, there are four bridge instances, each bonded to one LAN port and one logical Ring port. Physically there is only one Ring port (merged Ringlet0 and Ringlet1), but it is divided up to four logical Ring ports by Ring Ingress Rule Checking Block, using SVIDs steer each frame to the corresponding bridge (LAN port).

In ARPORT-PR and TRPORT-SR mode, there is only one bridge instance, which is bonded to LAN Port 1 and RING port.

Figure 1:
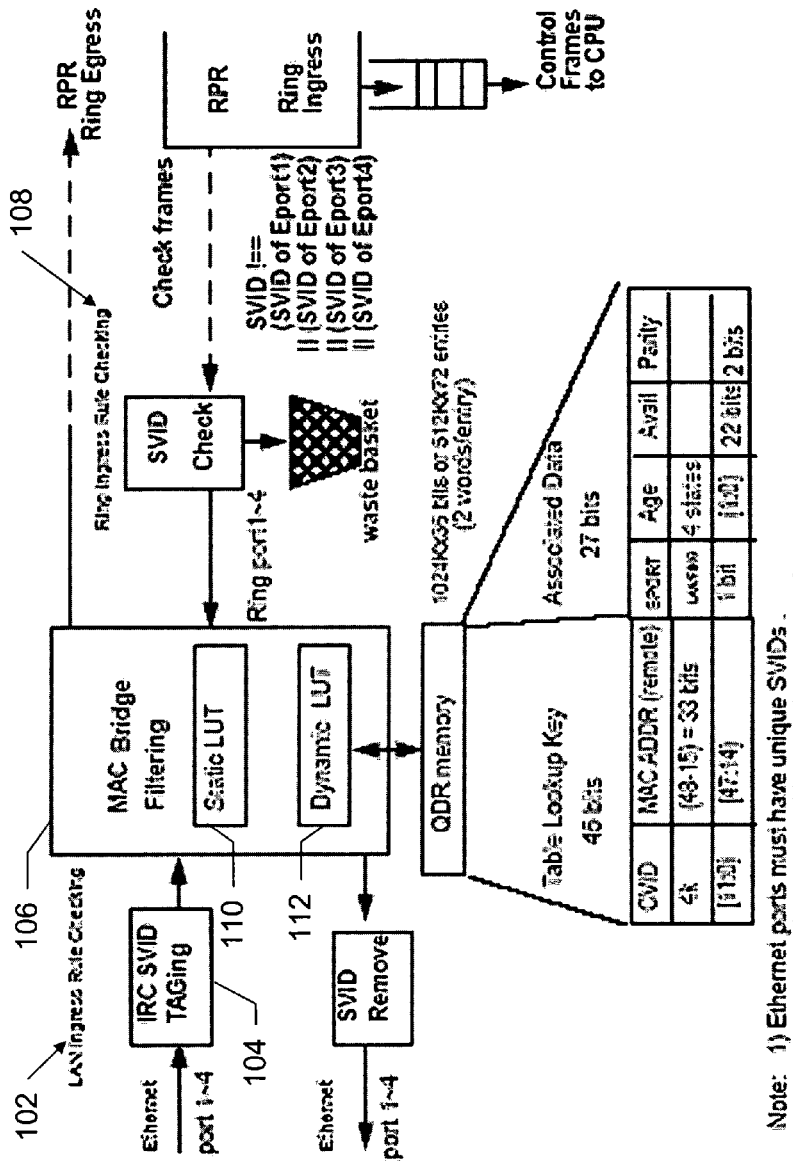
FIG. 1 is an exemplary block diagram of Ethernet MAC header processing.

FIG. 1 illustrates a simplified diagram of (native) Ethernet MAC header processing in ARPORT-SR mode. Inside LAN Ingress Rule Checking block 102, each LAN ingress packet is tagged with an assigned Service Provider VLAN ID (SVID) 104, which is provisioned by a TL1 command for that LAN port. Then the header of this packet is forwarded to the MAC Bridge Filtering block 106. The MAC Bridge Filtering block combines the source address (SA) or destination address (DA) and the customer VLAN ID (CVID) of the packet and generates a cyclic redundancy check (CRC) hash of this combination to form a key to search the static lookup table (LUT) 110 and dynamic LUT 112 associated with the bridge, in order to determine if the packet should be filtered (dropped) or forwarded (passed) to the Ring. Control packets from Ring are forwarded to the CPU (not shown) while data packets from the Ring go through Ring Ingress Rule Checking block 108. Frames with matched SVIDs are forwarded to the MAC Bridge Filtering block 106 for the MAC address lookup. Unfiltered frames are sent to the SVID designated LAN port after the SVID is removed. An example of the content of a MAC entry in the dynamic LUT 112 is shown at the bottom of the diagram. The static LUT 110 traps frames with SA or DA fields specified in the TL1 commands.

Figure 2:
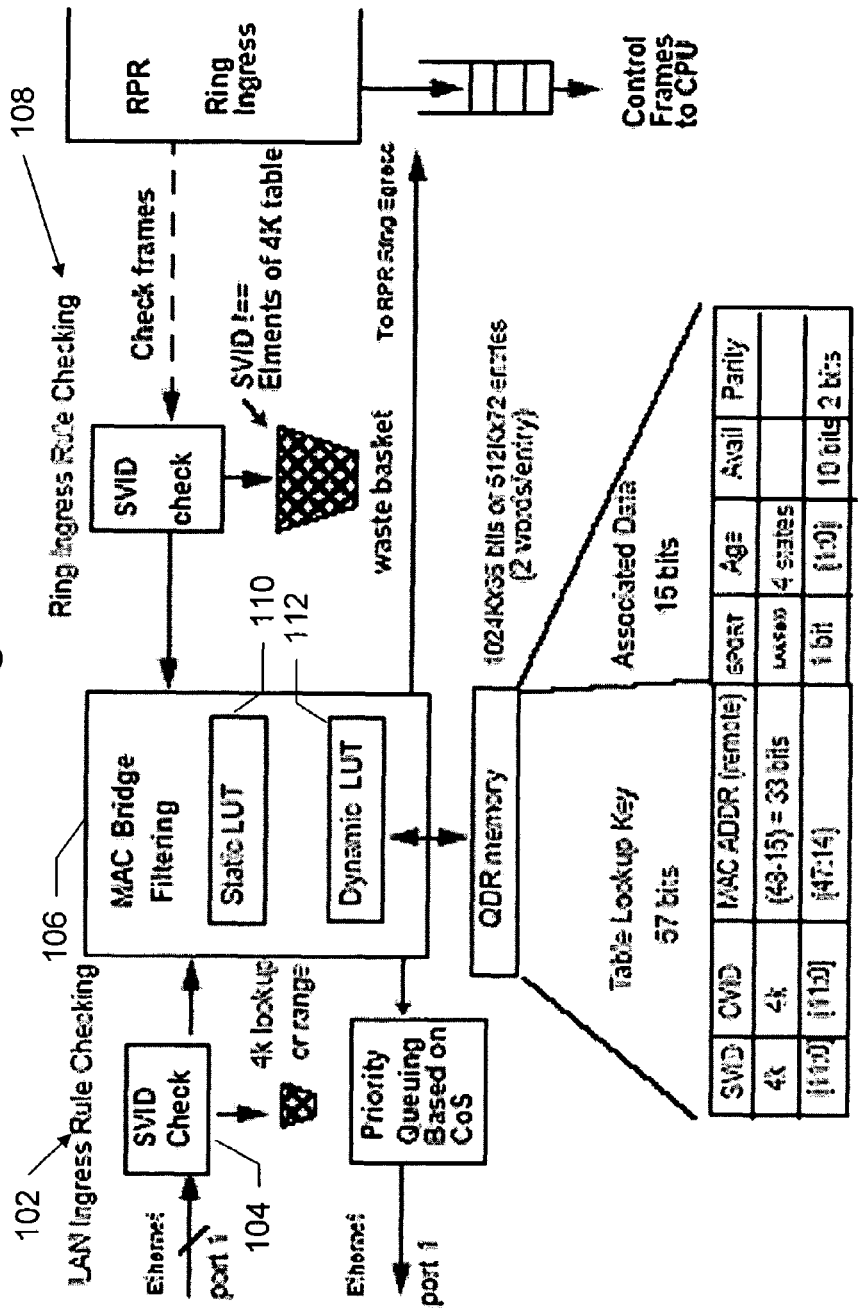
FIG. 2 is an exemplary block diagram of Ethernet MAC header processing.

FIG. 2 illustrates a simplified diagram of (native) Ethernet MAC header processing in TRPORT-SR mode. There is only one LAN port and one Ring port in this mode. Inside LAN Ingress Rule Checking block 102, each LAN ingress frame is validated against the Service Provider VLAN ID (SVID) table 104, which is provisioned by TL1 command for that LAN port. Frames with invalid SVID are dropped while the header of a valid packet is forwarded to the MAC Bridge Filtering block 106. The MAC Bridge Filtering block combines the SA, CVID and SVID of the frame and generates a cyclic redundancy check (CRC) hash of this combination to form a key to the dynamic LUT 112, in order to determine if the frame should be filtered (dropped) or forwarded (passed) to the Ring. In the other direction of traffic flow, control frames from the Ring are forwarded to the CPU (not shown) while data frames from the Ring go through Ring Ingress Rule Checking block 108. Frames with matched SVID are forwarded to the MAC Bridge Filtering block 106 for the MAC address lookup. Unfiltered frames are sent to LAN port priority queues. An example of the content of a MAC entry in the dynamic LUT 112 is shown at the bottom of the diagram. The Static LUT 110 traps frames with SA or DA and SVID fields specified in the TL1 commands.

Figure 3:
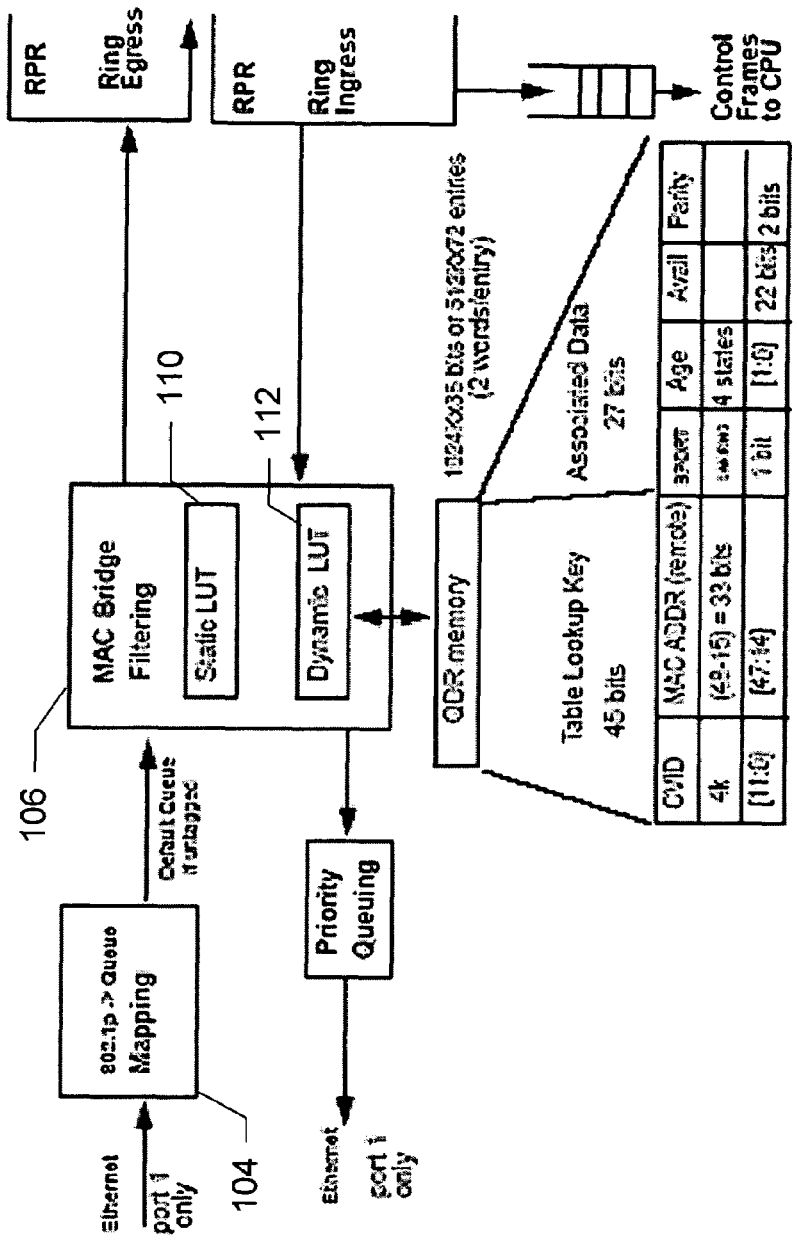
FIG. 3 is an exemplary block diagram of Ethernet MAC header processing.

FIG. 3 illustrates a simplified diagram of (native) Ethernet MAC header processing in ARPORT-PR mode. There is only one LAN port and one Ring port in this mode. Each LAN ingress packet is mapped to one of three CoS classes using a native (customer) VLAN ID (CVID). Default CoS class will be assigned to untagged packets. The header of the packet is forwarded to the MAC Bridge Filtering block 106. The MAC Bridge Filtering block 106 combines the SA or DA and customer VLAN-ID of the packet and generates a cyclic redundancy check (CRC) hash of this combination to use as a key to search the LUTs 110, 112, in order to determine if the packet should be filtered (dropped) or forwarded (passed) to the Ring. In the other direction of traffic flow, control packets from the Ring are forwarded to the CPU (not shown) while data packets are forwarded to the MAC Bridge Filtering block 106 for the MAC address lookup. Unfiltered packets are sent to LAN port priority queues. An example of the content of a MAC entry in the LUT 110, 112 is shown at the bottom of the diagram. The Static LUT 110 traps frames with SA or DA field specified in the TL1 commands.

There are commonalities of MAC entry data format in all three modes, as shown in FIG. 4, which is an example of a MAC Lookup Table Entry Data Format List. One common format with proper masking can be used for all three modes with this design.

Figure 6:
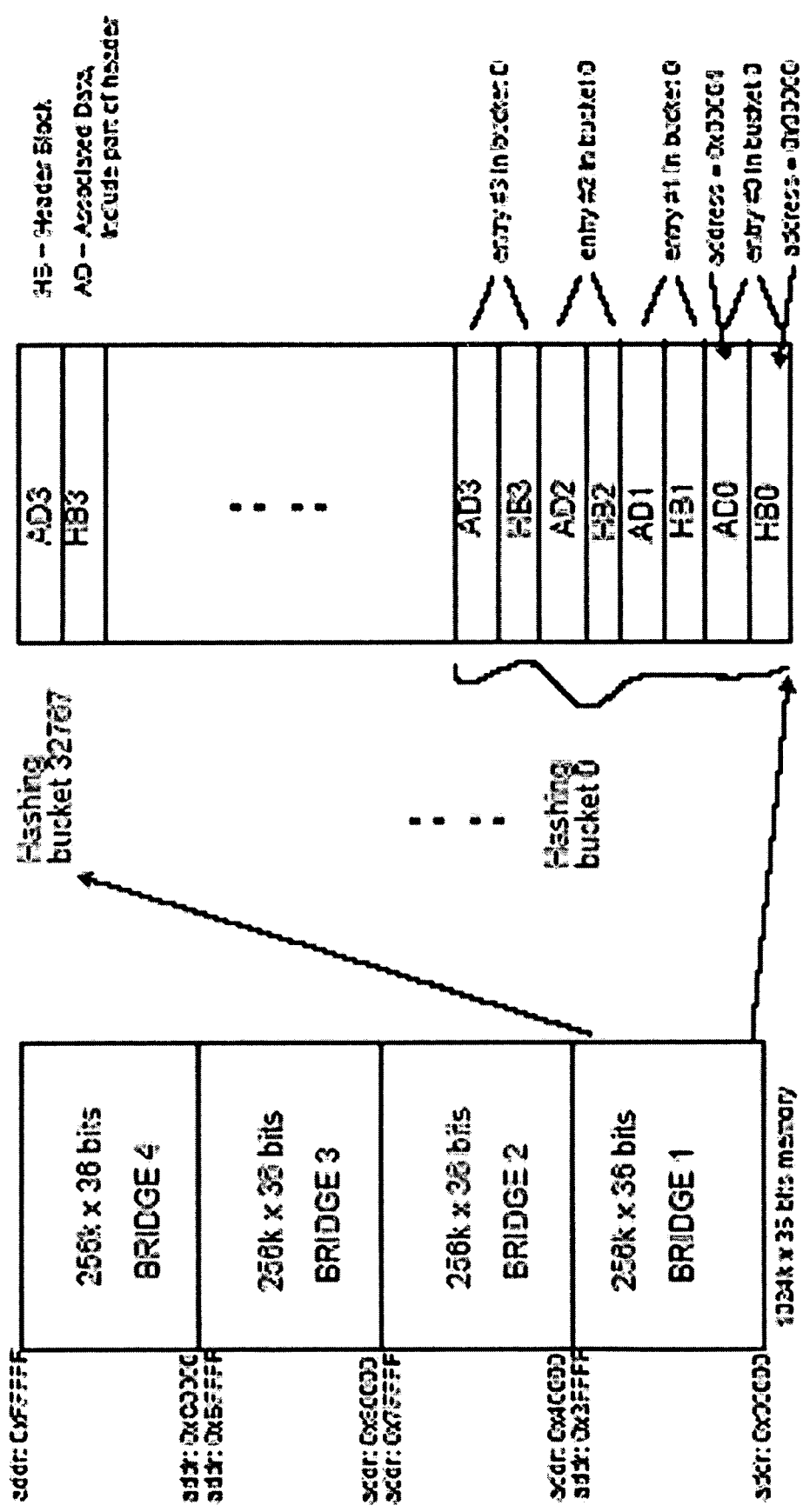
FIG. 6 is an exemplary diagram of a lookup table data structure in memory.

Physically, one MAC entry in the dynamic lookup table consists of two words: HB, the even word and AD, the odd word as shown in FIG. 5, which is a format of MAC Dynamic Entry Common Format Bit Definitions. In the figure, HB stands for header block and AD stands for associated data for convenience. The entries include:

AGE—Age of the entry: 00—aged-out entry or invalid entry, 01,10,11—age of a valid entry
BPORT—Bridge Port of the MAC address sourced from
AVAIL—Reserved bits for future use
PARITY—Odd parity, one bit covers each word in an entry and its bucket address bits
MAC_ADDR—Most significant 33 bits of a 48 bit IEEE 802.1D Ethernet MAC address FIG. 6 is a diagram of the data structure in the AUX QDR memory, which is used to hold four lookup tables, one for each bridge. There are 32K hash buckets in each LUT and each hash bucket can hold four 72-bit MAC entries. The Header Blocks (HB) reside in the even memory locations, and Associated Data (AD) reside in the odd memory locations. The bucket number is the index to the LUT. A CRC-15 function of the 72 bit MAC header, in the sequence of 12 bit SVID, 12 bit CVID and 48 bit MAC address is used to generate a randomized bucket number for the purposes of:

1. Supporting independent VLAN learning. SVID is set to zero in ARPORT-SR/PR modes and CVID is set to zero if untagged to calculate the CRC-15.
2. Avoiding excessive bucket overflow during lab testing environment and evenly spread the learned entries in the hashing table.

The properties of the CRC-15 function enable the memory space savings by not storing lower 15 bits of the MAC address inside the hashing table. During a following lookup, there is no need to recover or compare the lower 15 bits of the MAC address, since mathematically it is proven that matching SVID, CVID and upper 33 bits of MAC address together with a matching bucket number lead to the matching lower 15 bits of the MAC address.

The MAC Bridge Filtering consists of the following functions:

Interface to Bridge/MMU datapath block for reading frame headers and writing resolution results.
Interface to external QDR hash table memory and BIST. A 1Mx36 QDR memory is used to hold up four MAC look-up tables (LUT), one for each bridge. Each LUT has 32K hashing buckets (four entries per bucket).
Support MAC address learning and dynamic MAC entry ageing with CPU provisioned ageing time
Support SBPF (same bridge port filtering) on both LAN port and RING port.
Support static entries insertion from CPU and filtering based on a frame's MAC source address (SA) and destination address (DA).
Provide separate statistics on packet discard due to SA filtering, DA filtering and SBPF.
Support MAC address port movement detection and aggregated oscillation counts
Other functions to facilitate lab debugging.

In the MAC bridge filter hardware design, the bridge filter is divided into 32K bucket with each bucket holding 4 MAC addresses with their associated SVID and CVID. The 12-bit SVID concatenated with the 12-bit CVID and 48-bit MAC address forms the unique entry for the filter, which is essentially a hash table, addressed by this 72-bit string. Moreover, the case where the 72-bit search strings carried in the incoming packets are not necessarily random must be considered. For example, the typical lab test procedures may want to test the following scenarios:

Walking One Test: keep all bits of the MAC address to be zero except one bit, change the position of the "1" bit from bit 0 to bit 47 of the MAC address.
Incremental MAC Address: pickup any continuous 15 bits of the MAC address, increment it from 0 to 32767 while keeping all other bits of the string unchanged (we are required to support 32K MAC address only).
Incremental SVID: increment SVID from 0 to 4095, while keeping all other bits of the string unchanged.
Incremental CVID: increment CVID from 0 to 4095, while keeping all other bits of the string unchanged.

The hash function used for the MAC bridge filter design should be able to minimize bucket overflow for all the scenarios above. A bucket is overflowed when there are already 4 entries in the bucket and another different 72-bit string is hashed into this bucket.

Due to the following properties of the CRC-15, it is chosen as the hash function for the MAC bridge filter:

1. It detects any two bits error within the 72-bit string, which is the case for Walking One Test.
2. It detects any odd number of bit errors.
3. It detects any burst error whose length is less than 15, which is the case for incremental MAC address, incremental SVID and incremental CVID tests.
4. When the input is fully random, the output of the CRC is random too.
5. Given a string's 57 most significant bits (msbs) and its CRC signature, the string's 15 least significant bits (lsbs) are uniquely determined.

A cyclic redundancy check (CRC) is a type of hash function used to produce a checksum, which is a small number of bits, from a large block of data, such as a packet of network traffic or a block of a computer file, in order to detect errors in transmission or storage. A CRC is computed and appended before transmission or storage, and verified afterwards to confirm that no changes occurred. CRCs are popular because they are simple to implement in binary hardware, are easy to analyze mathematically, and are particularly good at detecting common errors caused by noise in transmission channels.

Examples of CRC functions include:
CRC-8 $x^8+x^2+x+1$
CRC-15 $x^{15}+x+1$
CRC-CCITT $x^{16}+x^{12}+x^5+1$
CRC-16 (IBM) $x^{16}+x^{15}+x^2+1$
CRC-32 (802.3) $x_{32}+x^{26}+x^{23}+x^{22}+x^{16}+x^{12}+x^{11}+x^{10}+x^8+x^7+x^5+x^4+x^2+x+1$
CRC32c $x^{32}+x^{28}+x^{27}+x^{26}+x^{25}+x^{23}+x^{22}+x^{20}+x^{19}+x^{18}+x^{14}+x^{13}+x^{11}+x^{10}+x^9+x^8+x^6+1$ Any CRC function may be used as a hash function for MBF design, or for any bridging filter design. In this particular implementation, the CRC-15 function is particularly well suited, based on a 72 bit table entry having 57 msbs and 15 lsbs.

It may be shown that given a string's 57 msbs and its CRC signature, the string's 15 lsbs are uniquely determined. The CRC-15 function is defined as follows:

$$G(x)=x^{15}+x+1.$$

Given two strings each having 72 bits, and each having the same 57 msbs, if their CRC-15 signatures are the same (CRC-15's $G(x)=x^{15}+x+1$), they must have the same 15 lsbs, i.e. the two strings must match.

Proof:
1) First, decompose string1 to $P_{57}(x)+P_1(x)$ and string2 to $P_{57}(x)+P_2(x)$ where $P_{57}(x)$ represents the polynomial composed of the 57 msbs and $P_1(x)$ and $P_2(x)$ represent the polynomial composed of the 15 lsbs.
2) From CRC-15, we have:

$$x^{15}*(P_{57}(x)+P_1(x))=Q_1(x)*G(x)+R(x) \quad \text{(eq. 1)}$$

$$x^{15}*(P_{57}(x)+P_2(x))=Q_2(x)*G(x)+R(x) \quad \text{(eq. 2)}$$

$$(\text{eq. 1})-(\text{eq. 2}) => x^{15}(P_1(x)-P_2(x))=(Q_1(x)-Q_2(x))*G(x) \quad \text{(eq. 3)}$$

3) Since $x^{15}$ is not divisible by $G(x)$, to make (eq. 3) hold, $P_1(x)-P_2(x)$ must be divisible by $G(x)$. Moreover, Since $G(x)$'s highest index is 15 while $P_1(x)$ and $P_2(x)$'s highest index is 14, $P_1(x)-P_2(x)$ must be 0 in order to be divisible by $G(x)$, i.e., $P_1(x)$ must be equal to $P_2(x)$.

As a result, the 15 lsbs of the 72-bit string are not written into the hash table, in order to save hardware resources. However, in some circumstances it is useful to see the full 72-bit header for debug and monitoring purposes. One naive way to recover the 15 lsbs of the 72-bit string is to try all combinations of the 15 bits to see which one matches the CRC-15 value. But this requires 32768 CRC-15 calculations in the worst case, and half that number on average. A faster method to recover the 15 lsbs of the 72-bit string given its 57 msbs and its CRC-15 signature is as follows:

The CRC-15 calculation is written as the following:

$$x^{15}*(P_{57}(x)+P_{15}(x))=Q(x)*G(x)+R(x) \quad \text{(eq. 4)}$$

where:
$P_{57}(x)=a_{56}x^{71}+a_{55}x^{70}+ \ldots +a_i x^{i+15}+ \ldots +a_0 x^{15}$, where i=0~56,
$P_{15}(x)=b_{14}x^{14}+b_{13}x^{13}+ \ldots +b_j x^j + \ldots +b_0$, where j=0~14,
$Q(x)=q_{71} x^{71}+q_{70}x^{70}+ \ldots +q_k x^k + \ldots +q_0$, where k=0~71,
$R(x)=r_{14}x^{14}+r_{13}x^{13}+ \ldots +r_j x^j + \ldots +r_0$, where j=0~14,
and $G(x)=x^{15}+x+1$.

Now, given $a_i$ (i=0~56) and $r_j$ (j=0~14), $b_j$ (j=0~14) and $q_k$ (k=0~71) can be uniquely determined by solving a set of linear equations, as shown below.

1. Rewrite the (eq. 4) as the following ("−" is same as "+" in CRC's binary arithmetic without carries).

$$x^{15}(a_{56}x^{71}+ \ldots +a_i x^{i+15}+ \ldots +a_0 x^{15}+b_{14}x^{14}+ \ldots +b_j x^j + \ldots +b_0)+r_{14}x^{14}+ \ldots +r_j x^j + \ldots +r_0 = (q_{71}x^{71}+ \ldots +q_k x^k + \ldots +q_0)(x^{15}+x+1) \quad \text{(eq. 5)}$$

2. Make the coefficients of the same index of x to be equal, we have:

$$a_i=q_{i+15} \text{ for } i=43\text{~}56 \quad \text{(eq. 6)}$$

$$a_{42}=q_{57}+q_{71} \quad \text{(eq. 7)}$$

$$a_i=q_{i+15}+q_{i+29}+q_{i+30} \text{ for } i=0\text{~}41 \quad \text{(eq. 8)}$$

$$r_0=q_0 \quad \text{(eq. 9)}$$

$$r_i=q_{i-1}+q_i, \text{ for } i=1\text{~}14 \quad \text{(eq. 10)}$$

$$b_i=q_i+q_{i+14}+q_{i+15}, \text{ for } i=0\text{~}14 \quad \text{(eq. 11)}$$

3. Rearrange the (eq. 6, 7, 8, 9 and 10) to put the unknowns ($q_i$) to the left and the constants ($a_i$ and $r_j$) to the right, and represents the set of equations using matrices:

$$PQ=C$$

4. P is a square non-singular lower triangular matrix with a rank of 72. Therefore, Q has unique solution.
5. From (eq. 11), $b_i$ (i=0~14) can be uniquely determined.
6. So far, we have derived the Q(x) for the 72-bit search string and have recovered the lower 15 bits of the string as well.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A MAC bridge filter comprising:
   circuitry operable to receive network traffic from a LAN network over a LAN port and an optical network over a ring port, wherein a packet of network traffic is received on a one of the ring port or a LAN port, the packet having at least one of a MAC address of a source of the packet and a MAC address of a destination of the packet;
   a lookup table operable to store a plurality of cyclic redundancy check hashes, each cyclic redundancy check hash generated from data including a MAC address, wherein the MAC address is a 48 bit MAC address and the least significant 15 bits of the MAC address are not stored in the lookup table;
   circuitry operable to lookup the MAC address of the packet in the lookup table, comprising:
      circuitry operable to generate a cyclic redundancy check hash of data including the MAC address of the packet and at least one of an identifier assigned to a service provider that is included with the packet that and associated with a network port on which the packet was received or a network port from which the packet is to be transmitted and an identifier assigned to a customer that is included with the packet that and associated with a network port on which the packet was received or a network port from which the packet is to be transmitted, and
      circuitry operable to lookup the MAC address of the packet in the lookup table using the generated cyclic redundancy check hash of the data including the MAC address of the packet; and
      circuitry operable to pass or drop each packet based on whether or not the MAC address of the packet is found in the lookup table.

2. The MAC bridge filter of claim 1, wherein the cyclic redundancy check hash generated from data including the MAC address, the identifier of the service provider, and the identifier of the customer comprises less data than the data including the MAC address, the identifier of the service provider, and the identifier of the customer.

3. The MAC bridge filter of claim 2, wherein the MAC address, the identifier of the service provider, and the identifier of the customer are recoverable from the cyclic redundancy check hash.

4. The MAC bridge filter of claim 1, wherein the cyclic redundancy check hash of the data including the MAC address and the cyclic redundancy check hash of the data including the MAC address of the packet are both generated using a function $G(x)=x^{15}+x+1$.

5. The MAC bridge filter of claim 4, wherein the MAC address comprises 48 bits, the identifier of the service provider comprises 12 bits, the identifier of the customer comprises 12 bits, and the cyclic redundancy check hash comprises 15 bits.

6. The MAC bridge filter of claim 5, wherein the MAC address comprising 48 bits, the identifier of the service provider comprising 12 bits, the identifier of the customer comprising 12 bits are recoverable from the cyclic redundancy check hash comprising 15 bits.

7. A method of MAC bridge filtering comprising:
receiving network traffic from a LAN network over a LAN port and an optical network over a ring port, wherein a packet of network traffic is received on a one of the ring port or a LAN port, the packet having at least one of a MAC address of a source of the packet and a MAC address of a destination of the packet;
storing in a lookup table a plurality of cyclic redundancy check hashes, each cyclic redundancy check hash generated from data including a MAC address, wherein the MAC address is a 48 bit MAC address and the least significant 15 bits of the MAC address are not stored in the lookup table;
looking up the MAC address of the packet in the lookup table, by:
generating a cyclic redundancy check hash of data including the MAC address of the packet and at least one of an identifier assigned to a service provider that is included with the packet that and associated with a network port on which the packet was received or a network port from which the packet is to be transmitted and an identifier assigned to a customer that is included with the packet that and associated with a network port on which the packet was received or a network port from which the packet is to be transmitted, and
looking up the MAC address of the packet in the lookup table using the generated cyclic redundancy check hash of the data including the MAC address of the packet; and
determining whether to pass or drop each packet based on whether or not the MAC address of the packet is found in the lookup table.

8. The method of claim 7, wherein the cyclic redundancy check hash generated from data including the MAC address, the identifier of the service provider, and the identifier of the customer comprises less data than the data including the MAC address, the identifier of the service provider, and the identifier of the customer.

9. The MAC bridge filter of claim 8, wherein the MAC address, the identifier of the service provider, and the identifier of the customer are recoverable from the cyclic redundancy check hash.

10. The method of claim 7, wherein the cyclic redundancy check hash of the data including the MAC address and the cyclic redundancy check hash of the data including the MAC address of the packet are both generated using a function $G(x)=x^{15}+x+1$.

11. The MAC bridge filter of claim 10, wherein the MAC address comprises 48 bits, the identifier of the service provider comprises 12 bits, the identifier of the customer comprises 12 bits, and the cyclic redundancy check hash comprises 15 bits.

12. The MAC bridge filter of claim 11, wherein the MAC address comprising 48 bits, the identifier of the service provider comprising 12 bits, the identifier of the customer comprising 12 bits are recoverable from the cyclic redundancy check hash comprising 15 bits.

* * * * *